United States Patent [19]
Denis

[11] 4,015,188
[45] Mar. 29, 1977

[54] WELDING GENERATOR EXCITER CONTROL

[76] Inventor: Albert P. Denis, 2050 Brookview Road, Castleton, N.Y. 12033

[22] Filed: Sept. 19, 1975

[21] Appl. No.: 614,982

[52] U.S. Cl. .................................. 322/28; 322/59; 322/72; 219/133

[51] Int. Cl.² ...................... H02P 9/10; H02P 9/26

[58] Field of Search .................. 219/133, 134, 132; 322/47, 19, 64, 27, 28, 37, 59, 60, 72, 73

[56] References Cited
UNITED STATES PATENTS

| | | | |
|---|---|---|---|
| 2,719,259 | 9/1955 | Miner, Jr. ........................ | 322/59 X |
| 2,734,116 | 2/1956 | Rybolt ............................ | 322/59 X |
| 3,505,587 | 4/1970 | Carroll et al. ................... | 322/73 X |
| 3,649,903 | 3/1972 | Fiedler ............................ | 322/27 |

Primary Examiner—Robert J. Hickey
Attorney, Agent, or Firm—Sughrue, Rothwell, Mion, Zinn & Macpeak

[57] ABSTRACT

An apparatus and a method for controlling the exciter current in a welding generator such that the open circuit voltage of the generator is regulated within suitable limits prior to arc start. A voltage controlled relay is connected to the generator's output and controls the inclusion of a voltage regulated biasing circuit in the base circuit of a transistor connected in series in the exciter circuit to assure that when the voltage exceeds a preset level of the voltage controlled relay, the exciter current will remain substantially constant.

5 Claims, 1 Drawing Figure

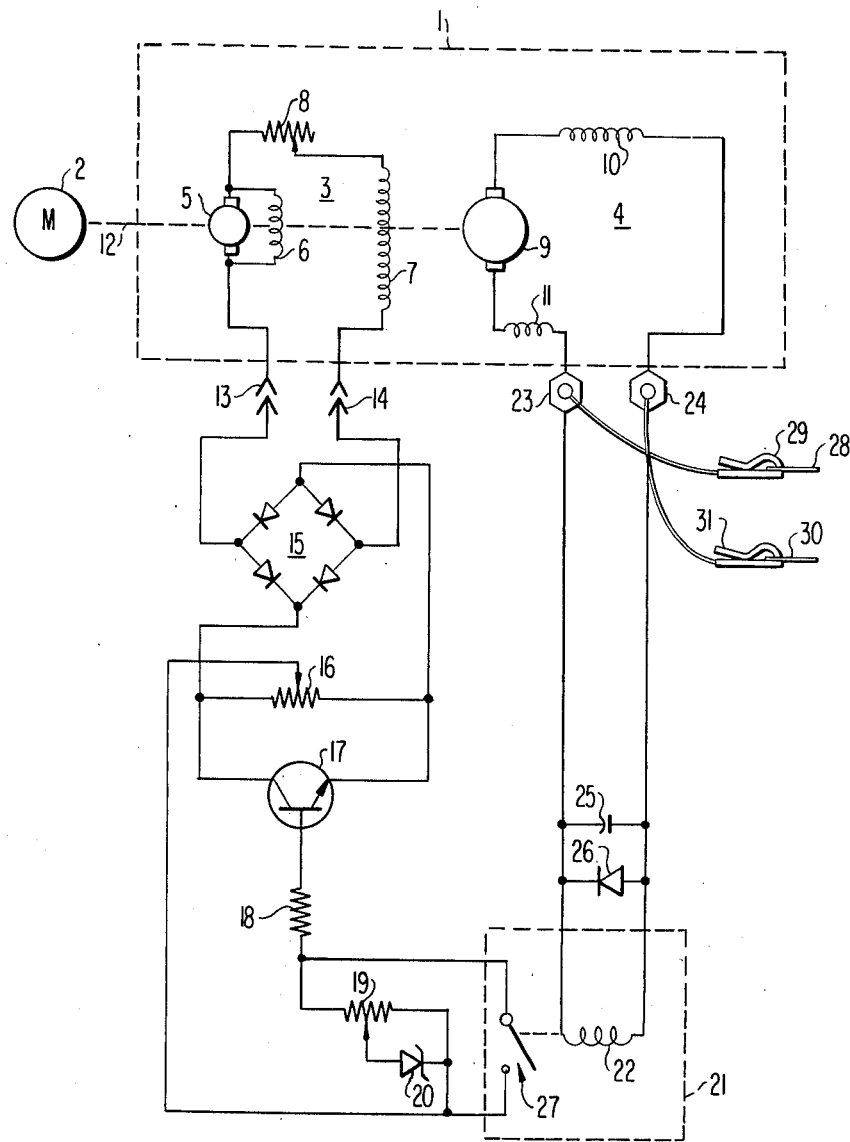

WELDING GENERATOR EXCITER CONTROL

BACKGROUND OF THE INVENTION

The present invention generally relates to voltage control of a welding generator, and more particularly, to an apparatus and a method for controlling the exciter current in a welding generator such that the open circuit voltage of the generator is regulated within suitable limits prior to arc start.

Conventionally, voltage control of a welding generator is accomplished after the initiation of the arc. In a generator having a fixed speed, voltage control is usually no problem. However, when a gasoline or diesel engine is used to drive the generator, the varying speed at idle, or operating speed, results in a great range of operating voltages, or in some cases the lack of proper voltage. This varying voltage makes it exceedingly difficult for an automatic welding apparatus to properly start a weld. While known voltage regulators for welding generators operate sufficiently well during the welding operation itself, they do not function to control the generators output voltage prior to striking of the arc.

SUMMARY OF THE INVENTION

It is therefore an object of the present invention to provide a method and apparatus for the regulation of a welding generator open circuit voltage regardless of the generator's rotational speed.

It is another object of my invention to provide a method of voltage control prior to striking of the arc such that the open circuit voltage remains within preset limits.

The foregoing and other objects of the invention are accomplished by providing in a separately excited, differentially compounded welding generator circuit including an exciter and a generator assembled on a common shaft with a driving motor or engine, a voltage controlled relay attached to the generator's output terminals which controls the inclusion of a voltage regulated biasing circuit in the base circuit of a transistor connected in series with the exciter when the output voltage exceeds a preset value. The operation of this circuit is such that when the output voltage exceeds the preset value, the exciter current will remain substantially constant regardless of the generator's rotational velocity.

BRIEF DESCRIPTION OF THE DRAWING

The specific nature of the invention, as well as other objects, aspects, uses and advantages thereof, will clearly appear from the following description and from the accompanying drawing, in which the sole FIGURE is a schematic diagram of a preferred embodiment of the exciter control according to my invention.

DESCRIPTION OF THE PREFERRED EMBODIMENT

Referring to the drawing, the welding generator 1 is driven by a motor or engine 2 and comprises an exciter 3 and a generator 4. The exciter 3 includes an armature 5 and a shunt exciter field 6. The exciter armature 5 is connected in series with the generator separately excited fields 7 and a voltage rheostat 8. The generator includes an armature 9 and series fields 10 and 11. The motor or engine 2 and the armatures 5 and 9 are assembled on the same shaft 12.

The welding generator as thus far described is conventional. According to my invention, the series connection between the exciter armature 5 and the generator separately excited fields 7 is broken, and jack connections 13 and 14 are provided to insert an exciter current control circuit. To this end, a diode rectifier bridge 15 is connected across the jacks 13 and 14. The output of the diode rectifier bridge 15 is connected across the winding of a potentiometer 16 which in turn is connected in shunt with the collector to emitter circuit of transistor 17. Base bias for the transistor 17 is established by voltage regulated circuit including series base resistor 18, a potentiometer 19 and a Zener diode 20. Resistor 18 and the winding potentiometer 19 are connected in series with the wiper arm of potentiometer 16. The Zener diode 20 is connected between the wiper arms of potentiometers 16 and 19.

A voltage controlled relay 21 has its armature 22 connected across the output terminals 23 and 24 of the generator 4. Connected across the armature 22 are a capacitor 25 and a diode 26 for over voltage protection. The relay contacts 27 of the voltage controlled relay 21 are connected between the wiper arm of potentiometer 16 and the junction between resistor 18 and the winding of potentiometer 19.

The voltage controlled relay 21 may be a Potter Brumfield CSL 38-30010 or the equivalent. This unit can be set to open the relay contacts within a range of from 18 to 32 volts. In a specific example, the voltage controlled relay 21 may be set to open its relay contacts 27 at a preset value of 27 volts.

The operation of my exciter control circuit should now be apparent. When a welding rod 28 held by a welding rod holder 29 connected to the output terminal 23 is brought into close proximity to a work piece 30 connected by clamp 31 to output terminal 24, an arc is struck between the welding rod 28 and the work piece 30. Prior to arc start, however, the exciter current is controlled by the transistor 17. Assuming first of all that the output voltage from the generator 4 across the output terminals 23 and 24 is less than 27 volts, the relay contacts 27 are closed shorting out the potentiometer 19 and Zener diode 20. In this condition, the base bias for transistor 18 is derived directly from the wiper arm of potentiometer 16 which is now connected to the base resistor 18. Thus, for open circuit output voltages less than 27 volts, the base bias and hence the conduction of transistor 17 is determined solely by the setting of the wiper arm of potentiometer 16. The purpose of potentiometer 16 is to maintain a minimum voltage to the generator 4 and to prevent total loss of excitation. When the open circuit output voltage across the output terminals 23 and 24 reaches the preset 27 volts, the relay contacts 27 are opened thereby inserting the potentiometer 19 and Zener diode 20 in the base bias circuit. In this condition the base bias voltage is adjusted by setting the wiper arm of the potentiometer 19. With the potentiometer 19 and the Zener diode 20 in the base bias circuit of transistor 17, the output voltage of the generator 4 will remain constant since the exciter current will be regulated within very close tolerance due to the Zener diode. If for some reason the motor or engine 2 were to slow down causing the open circuit output voltage across the output terminals 23 and 24 to fall below the preset value of 27 volts, the voltage controlled relay 21 would cause the relay contacts 27 to close again.

It will be apparent to those skilled in the art that my exciter control is useful to establish generator output voltages prior to arc start and is particularly suitable for automatic feeding control welding systems such as disclosed in my prior patent application Ser. No. 449,829 filed Mar. 11, 1974 now U.S. Pat. No. 3,934,110. It will also be apparent to those skilled in the art that the embodiment shown is only exemplary and that various modifications can be made in construction and arrangement within the scope of the invention as defined in the appended claims.

What is claimed is:

1. A method of controlling the open circuit output voltage of a separately excited, differentially compounded welding generator prior to arc start, said welding generator including an exciter armature connected in series with generator separately excited fields and a generator supplying output terminals, said method comprising the steps of:

breaking of the series connection between said exciter armature and said generator separately excited fields;

inserting an exciter current control device across the broken connection;

sensing the open circuit output voltage across said output terminals; and regulating the exciter current control device in response to the sensed output voltage, said exciter control device including a transistor having its collector to emitter circuit electrically connected in series between said exciter armature and said generator separately excited fields and the step of regulating comprises of the steps of:

connecting a first base bias circuit to said transistor to maintain a minimum voltage output from said generator and prevent loss of excitation when the open circuit output voltage sensed across said output terminals is below a predetermined value; and connecting a second voltage regulated base bias circuit to said transistor when the open circuit output voltage sensed across said output terminals exceeds said predetermined value.

2. An exciter control circuit for controlling the open circuit output voltage of a separately excited, differentially compounded welding generator including an exciter armature connected in series with generator separately excited fields and a generator connected to supply output terminals, comprising:

voltage sensing means connected to said output terminals for providing a regulating signal in response to the sensed open circuit output voltage across said output terminals;

a transistor having its collector to emitter circuit electrically connected in series between said exciter armature and said generator separately excited fields;

a first base bias circuit connected to said transistor to maintain a minimum voltage output from said generator and prevent loss of excitation when the open circuit output voltage sensed across said output terminals is below a predetermined value; and a second voltage regulated base bias circuit connected to said transistor in response to said regulating signal only when the open circuit output voltage across said output terminals exceeds said predetermined value.

3. An exciter control circuit as recited in claim 2 wherein said voltage sensing means comprises a voltage controlled relay preset to said predetermined value and having its relay contacts connected in shunt with said second voltage regulated base bias circuit.

4. An exciter control circuit as recited in claim 3 wherein said first base bias circuit includes a potentiometer connected in shunt across the collector to emitter circuit of said transistor, and a base resistor connected to the wiper arm of said potentiometer through said voltage controlled relay contacts.

5. An exciter control circuit as recited in claim 4 wherein said second voltage regulated base bias circuit includes a Zener diode connected across said voltage controlled relay contacts.

* * * * *